(12) United States Patent
Li (10) Patent No.: US 10,228,894 B2
(45) Date of Patent: Mar. 12, 2019

(54) DESKTOP SHARING METHOD AND TERMINAL

(71) Applicant: ZTE CORPORATION, Shenzhen (CN)

(72) Inventor: Huan Li, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 18 days.

(21) Appl. No.: 15/504,108

(22) PCT Filed: Oct. 23, 2014

(86) PCT No.: PCT/CN2014/089337
§ 371 (c)(1),
(2) Date: Feb. 15, 2017

(87) PCT Pub. No.: WO2016/023272
PCT Pub. Date: Feb. 18, 2016

(65) Prior Publication Data
US 2017/0262251 A1 Sep. 14, 2017

(30) Foreign Application Priority Data
Aug. 15, 2014 (CN) .......................... 2014 1 0401611

(51) Int. Cl.
*G09G 5/00* (2006.01)
*G06F 3/14* (2006.01)
(Continued)

(52) U.S. Cl.
CPC .......... *G06F 3/1462* (2013.01); *G06F 3/1454* (2013.01); *H04W 76/14* (2018.02);
(Continued)

(58) Field of Classification Search
CPC ........ G06F 3/1462; G06F 3/1454; G06F 3/14; H04W 76/14
See application file for complete search history.

(56) References Cited

U.S. PATENT DOCUMENTS

2012/0001832 A1  1/2012  Braghis et al.
2012/0040719 A1* 2/2012  Lee ...................... G06F 1/1626
                                                                        455/557
(Continued)

FOREIGN PATENT DOCUMENTS

CN   101610544 A1   12/2009
CN   101674110 A1   3/2010
CN   102724138 A    10/2012

OTHER PUBLICATIONS

PCT International Search Report dated May 19, 2015, Application No. PCT/CN2014/089331, 3 Pages.
(Continued)

*Primary Examiner* — Adam R. Giesy
(74) *Attorney, Agent, or Firm* — Plumsea Law Group, LLP (57) ABSTRACT

Provided are a desktop sharing method, terminal, corresponding computer program and carrier. The desktop sharing method includes the following steps. A first mobile terminal establishes a connection with a second mobile terminal. After the connection succeeds, the first mobile terminal sends a predetermined area image of a screen to the second mobile terminal to display the predetermined area image on a desktop of the second mobile terminal. In the present disclosure, the first mobile terminal establishes the connection with the second mobile terminal, and the first mobile terminal sends the predetermined area image of the screen to the second mobile terminal. Therefore, the second mobile terminal can see the image of the screen of the first mobile terminal. The desktop sharing between two mobile
(Continued)

terminals is realized. The problems that the related mobile terminals cannot realize real-time desktop sharing like computers and the user experience is relatively poor are solved.

11 Claims, 3 Drawing Sheets

(51) Int. Cl.
    *H04W 76/14*     (2018.01)
    *H04M 1/725*     (2006.01)

(52) U.S. Cl.
    CPC .... *H04M 1/72522* (2013.01); *H04M 2250/16* (2013.01); *H04M 2250/64* (2013.01)

(56) References Cited

U.S. PATENT DOCUMENTS

| | | | |
|---|---|---|---|
| 2013/0033435 A1* | 2/2013 | Raveendran | G06F 3/0481 345/173 |
| 2013/0144883 A1 | 6/2013 | Shin et al. | |
| 2013/0278484 A1* | 10/2013 | Hwang | G06F 3/1423 345/2.3 |
| 2015/0065056 A1* | 3/2015 | Won | G06F 3/1462 455/41.3 |

OTHER PUBLICATIONS

Extended European Search Report dated Jul. 13, 2017, Application No. 14899867.7-1972 / 3182681, Applicant ZTE Corporation, 8 Pages.

* cited by examiner

DESKTOP SHARING METHOD AND TERMINAL

CROSS-REFERENCE TO RELATED APPLICATIONS

This application is a U.S. national phase of PCT Application No. PCT/CN2014/089337 filed on Oct. 23, 2014, which claims priority to Chinese Patent Application No. 201410401611.7 filed on Aug. 15, 2014, the disclosures of which are incorporated in their entirety by reference herein.

TECHNICAL FIELD

The present disclosure relates to the technical field of desktop sharing, in particular to desktop sharing methods and terminals.

BACKGROUND

Desktop sharing usually is used for referring to mutual transmission and display of a desktop between two or more computers.

However, current desktop sharing all refers to sharing based on computers. In addition, in the current desktop sharing, images are all displayed in real time by other means such as intermediate buffer increase technology or streaming media compression technology or the like. The method occupies relatively high bandwidth and cannot adapt to mobile terminals.

As a result, the related mobile terminals cannot realize real-time desktop sharing like computers, and the user experience is relatively poor.

SUMMARY

The technical problem to be solved by the present disclosure is to provide desktop sharing methods and terminals to solve the problems that the related mobile terminals cannot realize real-time desktop sharing like computers and the user experience is relatively poor.

In order to solve the above-mentioned technical problem, the following technical solutions are adopted.

A desktop sharing method includes:

establishing, by a first mobile terminal, a connection with a second mobile terminal; and after the connection succeeds, sending, by the first mobile terminal, a predetermined area image of a screen to the second mobile terminal to display the predetermined area image on a desktop of the second mobile terminal.

In an exemplary embodiment, the step of sending, by the first mobile terminal, a predetermined area image of a screen to the second mobile terminal to display the predetermined area image on the desktop of the second mobile terminal includes:

detecting, by the first mobile terminal, a predetermined area of the screen according to a predetermined time length; and when the predetermined time length is reached, sending, by the first mobile terminal, an image of a current predetermined area to the second mobile terminal, and using, by the second mobile terminal, the received image to replace an image of a predetermined area received when a previous predetermined time length was reached to display the image of the current predetermined area on the desktop of the second mobile terminal; or when the predetermined time length is reached, judging, by the first mobile terminal, whether the image of the current predetermined area is the same as the image of the predetermined area obtained when the previous predetermined time length was reached; if the images are the same, waiting for a reaching of a next predetermined time length to detect the predetermined area of the screen and repeat the step of judging whether the image of the current predetermined area is the same as the image of the predetermined area obtained when the previous predetermined time length was reached; and if the images are not the same, sending, by the first mobile terminal, the image of the current predetermined area to the second mobile terminal, and using, by the second mobile terminal, the received image of the current predetermined area to replace the image of the predetermined area received when the previous predetermined time length was reached to display the image of the current predetermined area on the desktop of the second mobile terminal.

In an exemplary embodiment, the step of, when the predetermined time length is reached, judging, by the first mobile terminal, whether the image of the current predetermined area is the same as the image of the predetermined area obtained when the previous predetermined time length was reached includes:

when the predetermined time length is reached, intercepting, by the first mobile terminal, the current image corresponding to the predetermined area; and determining, the first mobile terminal, whether the current image of the predetermined area is the same as the image of the predetermined area obtained when the previous predetermined time length was reached according to an area change detection algorithm.

In an exemplary embodiment, the predetermined area at least includes one of the following areas:

using the entire screen as the predetermined area;

dividing the entire screen into a plurality of subareas, and using each subarea as one predetermined area, herein, each subarea includes one or more icons;

splitting the entire screen, and using each split-screen area as one predetermined area; and using an icon of each widget on the screen as one predetermined area.

A desktop sharing method includes:

establishing, by a second mobile terminal, a connection with a first mobile terminal; and after the connection succeeds, receiving, by the second mobile terminal, a predetermined area image of a screen sent by the first mobile terminal, and displaying the predetermined area image on a desktop of the second mobile terminal.

In an exemplary embodiment, the step of displaying the predetermined area image on the desktop of the second mobile terminal includes:

performing analysis on the received predetermined area image to determine a division situation of a predetermined area of the screen of the first mobile terminal; and displaying the predetermined area image on the desktop of the second mobile terminal according to the division situation.

In an exemplary embodiment, the step of performing analysis on the image to determine a division situation of a predetermined area of the screen of the first mobile terminal includes:

receiving the image of the predetermined area sent by the first mobile terminal, herein, the image of the predetermined area is an image of a current predetermined area of the first mobile terminal, and is directly sent by the first mobile terminal when a predetermined time length is reached, or is sent by the first mobile terminal when the predetermined time length is reached and the image of the current predetermined area is judged to be not the same as the image of the predetermined area obtained when a previous predetermined time length is reached;

judging, by the second mobile terminal, to which predetermined area the image of the predetermined area belongs after receiving the image of the predetermined area is received; and splicing the image of the predetermined area to the predetermined area of the screen after the predetermined area to which the image of the predetermined area belongs is determined.

A terminal includes a first connection module and a first sending module, herein:

the first connection module is arranged to make the terminal establish a connection with a second mobile terminal; and the first sending module is arranged to, after the connection succeeds, send a predetermined area image of a screen to the second mobile terminal to display the predetermined area image on a desktop of the second mobile terminal.

In an exemplary embodiment, the detection module is arranged to detect a predetermined area of the screen according to a predetermined time length; and judge whether an image of a current predetermined area is the same as an image of the predetermined area obtained when a previous predetermined time length was reached; and the first sending module is further arranged to, when the predetermined time length is reached, send the image of the current predetermined area to the second mobile terminal, and notify the second mobile terminal to use the received image of the current predetermined area to replace the image of the predetermined area received when the previous predetermined time length was reached to display the image of the current predetermined area on the desktop of the second mobile terminal; or when the predetermined time length is reached and the detection module judges that the image of the current predetermined area is not the same as the image of the predetermined area obtained when the previous predetermined time length was reached, notify the second mobile terminal to use the received the image of the current predetermined area to replace the image of the predetermined area received when the previous predetermined time length was reached to display the image of the current predetermined area on the desktop of the second mobile terminal.

In an exemplary embodiment, the detection module includes an image interception unit and a detection unit, herein:

the image interception unit is arranged to, when the predetermined time length is reached, intercept a current image corresponding to the predetermined area; and the detection unit is arranged to determine whether the current image of the predetermined area is the same as the image of the predetermined area obtained when the previous predetermined time length was reached according to an area change detection algorithm.

In an exemplary embodiment, the terminal further includes an area division module, herein:

the area division module is arranged to perform a division of the predetermined area on the screen, herein, the predetermined area at least includes one of the following areas:

using the entire screen as the predetermined area;

dividing the entire screen into a plurality of subareas, and using each subarea as one predetermined area, herein, each subarea includes one or more icons;

splitting the entire screen, and using each split-screen area as one predetermined area; and using an icon of each widget on the screen as one predetermined area.

A terminal includes a second connection module, a second receiving module and an analysis module.

The second connection module is arranged to make the terminal establish a connection with a first mobile terminal.

The second receiving module is arranged to, after the connection succeeds, receive a predetermined area image of a screen sent by the first mobile terminal.

The analysis module is arranged to perform analysis on the image of the screen to determine a division situation of a predetermined area of the screen of the first mobile terminal; and display the predetermined area image on a desktop of the second mobile terminal according to the division situation.

In an exemplary embodiment, the image of the predetermined area is an image of a current predetermined area of the first mobile terminal, and is directly sent by the first mobile terminal when a predetermined time length is reached, or is sent by the first mobile terminal when the predetermined time length is reached and the first mobile terminal judges that the image of the current predetermined area of the first mobile terminal is not the same as the image of the predetermined area obtained when a previous predetermined time length was reached;

the analysis module is further arranged to judge to which predetermined area the image of the predetermined area belongs after the image of the predetermined area is received; and the processing module is arranged to splice the image of the predetermined area to the predetermined area of the screen after the predetermined area to which the image of the predetermined area belongs is determined.

A computer program including program instructions is provided. When the program instructions are executed by a first mobile terminal, the first mobile terminal can implement the corresponding desktop sharing method. A carrier carrying the computer program is provided.

A computer program including program instructions is provided. When the program instructions are executed by a second mobile terminal, the second mobile terminal can implement the corresponding desktop sharing method. A carrier carrying the computer program is provided.

In the technical solution of the present disclosure, the first mobile terminal establishes the connection with the second mobile terminal, and the first mobile terminal sends the predetermined area image of the screen to the second mobile terminal. Therefore, the second mobile terminal can see the image of the screen of the first mobile terminal, and the desktop sharing between two mobile terminals is realized, and the problems that the related mobile terminals cannot realize real-time desktop sharing like computers and the user experience is relatively poor are solved.

DETAILED DESCRIPTION

In order to solve the problems that the related mobile terminals cannot realize real-time desktop sharing like computers, and the user experience is relatively poor, the present disclosure provides desktop sharing methods and terminals. The present disclosure will be further described below in detail with reference to the drawings in combination with the embodiments. It should be understood that the specific embodiments described here are just used for explaining the present disclosure instead of limiting the present disclosure.

Figure 1:
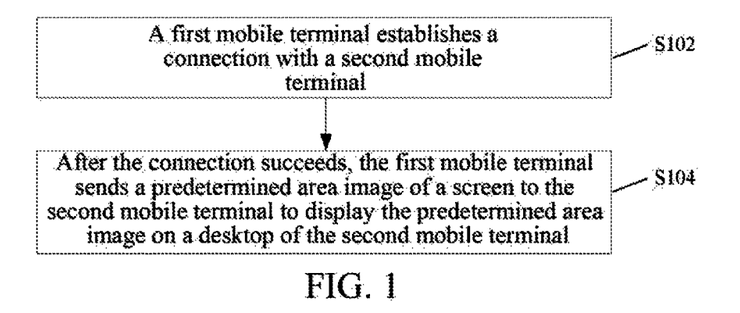
FIG. 1 illustrates a flowchart of a desktop sharing method in an embodiment of the present disclosure.

An embodiment of the present disclosure provides a desktop sharing method. A flow of desktop sharing method is as illustrated in FIG. 1, and includes step S102 to step S104.

In step S102, a first mobile terminal establishes a connection with a second mobile terminal.

In step S104, after the connection succeeds, the first mobile terminal sends a predetermined area image of a screen to the second mobile terminal to display the predetermined area image on a desktop of the second mobile terminal.

In the embodiment of the present disclosure, the first mobile terminal establishes the connection with the second mobile terminal, and the first mobile terminal sends the predetermined area image of the screen to the second mobile terminal. Therefore, the second mobile terminal can see the image of the screen of the first mobile terminal, and the desktop sharing between two mobile terminals is realized, and the problems that the related mobile terminals cannot realize real-time desktop sharing like computers and the user experience is relatively poor are solved.

During implementation, the first mobile terminal detects a predetermined area of the screen according to a predetermined time length. When the predetermined time length is reached, an image of the current predetermined area is sent to the second mobile terminal, and the second mobile terminal directly replaces an image of a predetermined area obtained when a previous predetermined time length was reached to display the image of the current predetermined area on the desktop of the second mobile terminal. This method is simple and feasible. However, the images of the predetermined area are required to be ceaselessly replaced. Of course, the following operations may be performed. When the predetermined time length is reached, whether the image of the current predetermined area is the same as the image of the predetermined area obtained when the previous predetermined time length was reached is judged. If the images are the same, it is to wait for reaching of a next predetermined time length to detect the predetermined area of the screen, and when the predetermined time length is reached again, the abovementioned step of judging whether the image of the current predetermined area is the same as the image of the predetermined area obtained when the previous predetermined time length was reached is repeated.

If the images are not the same, the image of the current predetermined area is sent to the second mobile terminal, and the second mobile terminal uses the image of the current predetermined area to replace the image of the predetermined area obtained when the previous predetermined time length was reached to display the image of the current predetermined area on the desktop of the second mobile terminal. In the method, a judgment process is added, and thus the image of the predetermined area is not required to be replaced when the predetermined time length is reached at each time.

Herein, the process of, when the predetermined time length is reached, judging whether the image of the current predetermined area is the same as the image of the predetermined area obtained when the previous predetermined time length was reached may include the following operations. When the predetermined time length is reached, a current image corresponding to the predetermined area is intercepted; and whether the current image of the predetermined area is the same as the image of the predetermined area obtained when the previous predetermined time length was reached is determined according to an area change detection algorithm. The area change detection algorithm is common knowledge for one skilled in the art and thus is not repetitively described here.

The abovementioned predetermined area may be divided according to the requirements of one skilled in the art and at least includes one of the following areas: using the entire screen as the predetermined area; dividing the entire screen into a plurality of subareas, and using each subarea as one predetermined area, herein, each subarea includes one or more icons; splitting the entire screen, and using each split-screen area as one predetermined area; and using an icon of each widget on the screen as one predetermined area.

Figure 2:
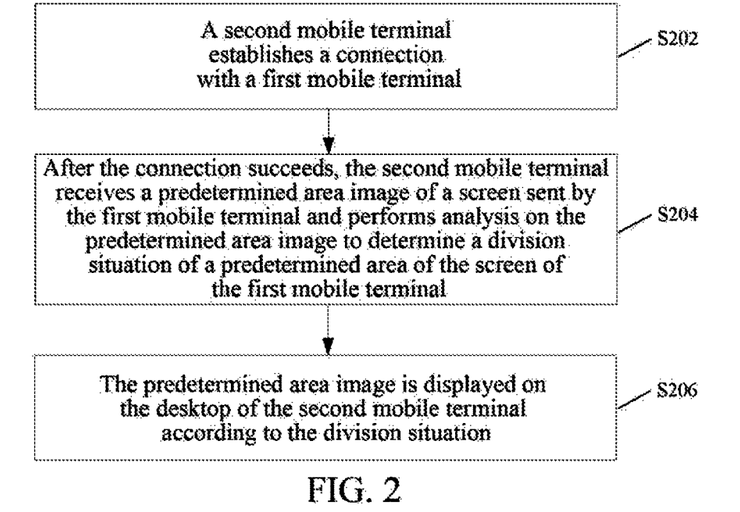
FIG. 2 illustrates a flowchart of another desktop sharing method in an embodiment of the present disclosure.

The above-mentioned desktop sharing method is applied to the first mobile terminal which actively shares the desktop. An embodiment of the present disclosure further provides a desktop sharing method applied to a second mobile terminal to be shared. A process of the desktop sharing method applied to a second mobile terminal to be shared is as illustrated in FIG. 2, and includes step S202 to step S206.

In step S202, a second mobile terminal establishes a connection with a first mobile terminal.

In step S204, after the connection succeeds, the second mobile terminal receives a predetermined area image of a screen sent by the first mobile terminal and performs analysis on the predetermined area image to determine a division situation of a predetermined area of the screen of the first mobile terminal.

In step S206, the predetermined area image is displayed on the desktop of the second mobile terminal according to the division situation.

Herein, in the process of performing analysis on the image to determine the division situation of the predetermined area of the screen of the first mobile terminal, firstly the image of the predetermined area sent by the first mobile terminal is received. Herein, the image of the predetermined area is an image of a current predetermined area of the first mobile terminal, and is sent by the first mobile terminal when a predetermined time length is reached, or is sent by the first mobile terminal when the image of the current predetermined area is judged to be not the same as the image of the predetermined area obtained when a previous predetermined time length was reached.

The second mobile terminal judges to which predetermined area the image of the predetermined area belongs after receiving the image of the predetermined area The image of the predetermined area is spliced to the predetermined area of the screen after the predetermined area to which the image of the predetermined area belongs is determined.

Figure 3:
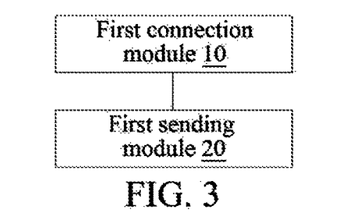
FIG. 3 illustrates a structural schematic diagram of a terminal in an embodiment of the present disclosure.

An embodiment of the present disclosure further provides a terminal which is used for sending an image for desktop sharing. A structural schematic diagram of the terminal is as illustrated in FIG. 3, and the terminal includes a first connection module 10 and a first sending module 20. The first connection module 10 is arranged to make the first mobile terminal establish a connection with a second mobile terminal. The first sending module 20, coupled to the first connection module 10, is arranged to, after the connection succeeds, send a predetermined area image of a screen to the second mobile terminal to display the predetermined area image on a desktop of the second mobile terminal.

Figure 4:
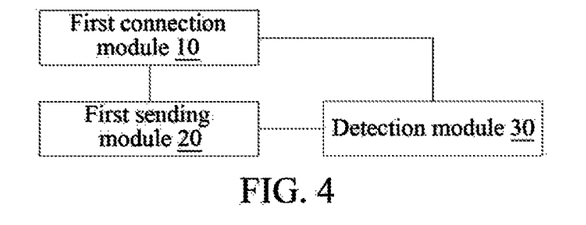
FIG. 4 illustrates a preferred structural schematic diagram of a terminal in an embodiment of the present disclosure.

As illustrated in FIG. 4, the abovementioned terminal may further include a detection module 30, coupled to the first connection module 10 and the first sending module 20 and arranged to detect a predetermined area of the screen according to a predetermined time length. The first sending module 20 is further arranged to, when the predetermined time length is reached, send the image of the current predetermined area to the second mobile terminal to replace an image of the predetermined area obtained when the previous predetermined time length was reached to display the image of the current predetermined area on the desktop of the second mobile terminal; or when it is judged that the image of the current predetermined area is not the same as the image of the predetermined area obtained when the previous predetermined time length was reached, replace the image of the predetermined area obtained when the previous predetermined time length was reached with the image of the current predetermined area to display the image of the current predetermined area on the desktop of the second mobile terminal.

Figure 5:
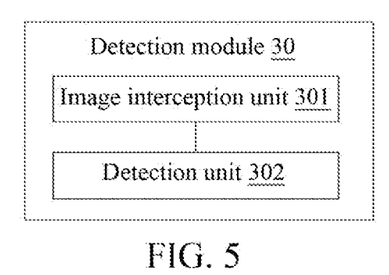
FIG. 5 illustrates a structural schematic diagram of a terminal detection module in an embodiment of the present disclosure.

A structural schematic diagram of the detection module 30 is as illustrated in FIG. 5, and the detection module 30 further includes an image interception unit 301 and a detection unit 302. The image interception unit 301 is arranged to, when the predetermined time length is reached, intercept a current image corresponding to the predetermined area. The detection unit 302, coupled to the image interception unit 301, is arranged to determine whether the current image of the predetermined area is the same as the image of the predetermined area obtained when the previous predetermined time length was reached according to an area change detection algorithm.

The abovementioned terminal may further include an area division module arranged to perform a division of the predetermined area on the screen. Herein, the predetermined area at least includes one of the following areas: using the entire screen as the predetermined area; dividing the entire screen into a plurality of subareas, and using each subarea as one predetermined area, herein, each subarea includes one or more icons; splitting the entire screen, and using each split-screen area as one predetermined area; and using an icon of each widget on the screen as one predetermined area.

Figure 6:
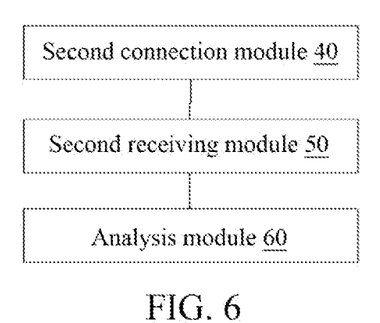
FIG. 6 illustrates a structural schematic diagram of another terminal in an embodiment of the present disclosure.

An embodiment of the present disclosure further provides a terminal used for receiving an image for desktop sharing. A structural schematic diagram thereof is as illustrated in FIG. 6, and the terminal includes a second connection module 40, a second receiving module 50 and an analysis module 60. The second connection module 40 is arranged to make the second mobile terminal establish a connection with a first mobile terminal. The second receiving module 50 coupled to the second connection module 40 and an analysis module 60 is arranged to, after the connection succeeds, receive a predetermined area image of a screen sent by the first mobile terminal. The analysis module 60 is arranged to perform analysis on the image of the screen to determine a division situation of a predetermined area of the screen of the first mobile terminal; and display the predetermined area image on a desktop of the second mobile terminal according to the division situation.

In an implementation process, the second receiving module 50 is further arranged to receive the image of the predetermined area sent by the first mobile terminal. Herein, the image of the predetermined area is an image of a current predetermined area of the first mobile terminal, and is sent by the first mobile terminal when a predetermined time length is reached, or is sent when the image of the current predetermined area is judged to be not the same as the image of the predetermined area obtained when a previous predetermined time length was reached. The analysis module is further arranged to judge to which predetermined area the image of the predetermined area belongs after the image of the predetermined area is received. The terminal further includes a processing module arranged to splice the image of the predetermined area to the predetermined area of the screen after the predetermined area to which the image of the predetermined area belongs is determined.

In an implementation process, one skilled in the art may arrange the abovementioned terminals in the mobile terminals, i.e., the terminals are arranged in mobile terminals sharing a desktop and to be shared. For example, when the first mobile terminal plays a video, the desktop may be shared to the mobile terminal to be shared by using the desktop sharing method. During implementation, the predetermined time length may be set according to different share demands, e.g., is set to 0.5 s or is set to 1 s, etc.

Alternative Embodiment

Since the related computers have a desktop sharing situation but mobile terminals do not have the desktop sharing situation, the applicant considers introducing the concept to mobile terminals to realize display sharing between mobile terminals. The display sharing between mobile terminals is very useful under many scenarios such as play sharing of multimedia photo or video, operation step sharing and mobile phone state sharing and the like.

In view of this, the embodiment of the present disclosure provides a desktop sharing method. A screen is divided into different areas. Whether each area is changed is respectively detected. If the area is changed, the image of the area is sent to a display terminal to be shared to update the display of the area. Of course, the screen may not be divided, and change detection and transmission are directly performed on the entire screen.

The embodiment further describes the technical solution by taking mobile phones as an example.

There are a mobile phone A and a mobile phone B, and the mobile phone B needs to receive and display screen contents of the mobile phone A.

Firstly, the screen display of the mobile phone A is divided into several parts. Simply, the screen display may be divided into two parts, i.e., a status bar and others (area 1 and area 2).

Of course, the screen may be divided into different areas according to display situations of different mobile phones. For example, for a multi-window/split-screen display mobile phone, different windows may be used as one area for processing. For another example, when there is a widget interface on a processed desktop, each widget may be used as a separate area, the other is used as one area and etc. The screen may also be not divided and is used as one area for transmission.

After the connection for sharing is established, whether the two areas of the mobile phone A are changed are respectively detected. If an area i is changed, an image of the area i is only transmitted to the mobile phone B. The mobile phone B updates the area i to the intercepted image of the entire screen and then the image is displayed. If no area is divided, the mobile phone B directly displays the received entire image. Herein, the manner of detecting the change of a certain area may be implemented through manners such as selecting a local image or a global image to perform difference processing and the like.

The technical solution of the present disclosure will be further described below in detail with reference to the drawings in combination with the specific embodiments.

Figure 7:
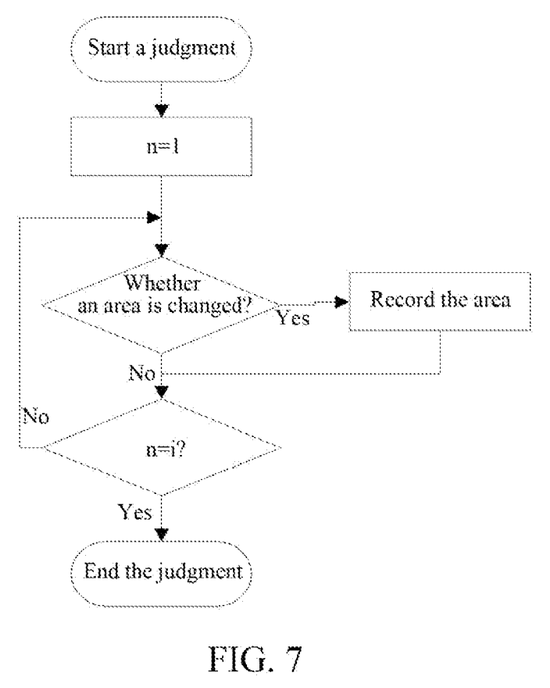
FIG. 7 illustrates a functional schematic diagram of a sending terminal A and a receiving terminal B in an alternative embodiment of the present disclosure.

FIG. 7 illustrates a functional schematic diagram of a sending terminal A and a receiving terminal B. As illustrated in FIG. 7, operations which are required to be completed on the terminal A with a desktop which is shared include:

1. Area division: a screen area is divided into i predetermined areas according to a requirement.

Figure 8:
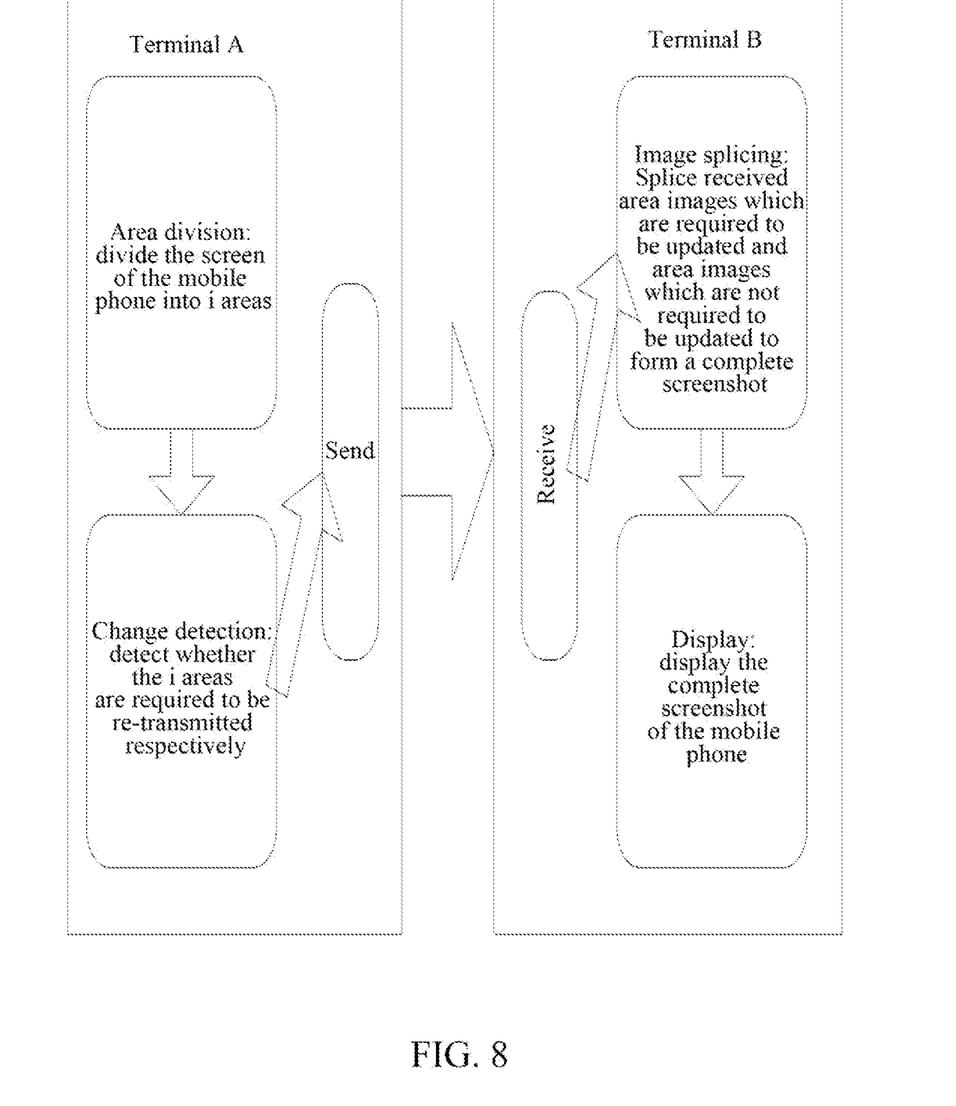
FIG. 8 illustrates a flowchart of detecting a predetermined area change in an alternative embodiment of the present disclosure.

2. Change detection:

A process thereof, as illustrated in FIG. 8, includes the following steps.

Starting from n=1 (n is a predetermined area), whether a change occurs when an image of a current area is compared with a previous image is judged. If the change occurs, the image of the area is recorded. Otherwise, whether n is equal to a maximum number i of predetermined areas is judged. If no, the image of a next area (n+1) is continuously judged, and judgment is stopped till n=i. During implementation, whether changes occur in i subareas obtained after a division is sequentially judged, the areas which are changed are recorded, and accordingly subareas which are required to be transmitted are determined. When transmission is performed at a first time, each area is sequentially judged. If there is no reference image for comparison, a current obtained image is directly saved.

3. Sending: the terminal A transmits the images of the areas which are changed to the terminal B, and the operations performed on the terminal A are completed.

Operations which are required to be completed on the terminal B which receives shared images include the following operations. The area images sent by the terminal A are received. Since the received images are area images instead of a complete mobile phone screenshot, the terminal B needs to perform image splicing, i.e., update the area images which are required to be updated, then various area images are spliced together like block building, and finally a complete intercepted image of the entire screen is formed. Then the spliced intercept image is displayed on a screen of the terminal B.

Although the alternative embodiments of the present disclosure have already been disclosed for an exemplary purpose, one skilled in the art shall be aware of that various improvements, additions and replacements are also possible. Therefore, the scope of the present disclosure shall be not limited to the above-mentioned embodiments.

INDUSTRIAL APPLICABILITY

In the technical solution of the present disclosure, the first mobile terminal establishes the connection with the second mobile terminal, and the first mobile terminal sends the predetermined area image of the screen to the second mobile terminal. Therefore, the second mobile terminal can see the image of the screen of the first mobile terminal, and the desktop sharing between two mobile terminals is realized, and the problems that the related mobile terminals cannot realize real-time desktop sharing like computers, and the user experience is relatively poor are solved. Therefore, the present disclosure has very great industrial applicability.

I claim:

1. A desktop sharing method, comprising:
   establishing, by a first mobile terminal, a connection with a second mobile terminal; and
   after the connection succeeds, sending, by the first mobile terminal, a predetermined area image of a screen of the first mobile terminal to the second mobile terminal to display the predetermined area image on a desktop of the second mobile terminal,
   judging, by the second mobile terminal, to which predetermined area of the first mobile terminal the image of the predetermined area belongs after receiving the image of the predetermined area; and
   splicing, by the second mobile terminal, the image of the predetermined area to a corresponding predetermined area of a screen of the second mobile terminal after the predetermined area to which the image of the predetermined area belongs is determined,
   wherein, the step of sending, by the first mobile terminal, a predetermined area image of a screen of the first mobile terminal to the second mobile terminal to display the predetermined area image on the desktop of the second mobile terminal comprises:
   detecting, by the first mobile terminal, a predetermined area of the screen of the first mobile terminal according to a predetermined time length; and
   when the predetermined time length is reached, judging, by the first mobile terminal, whether the image of the current predetermined area is the same as the image of the predetermined area obtained when the previous predetermined time length was reached; if the images are the same, waiting for a reaching of a next predetermined time length to detect the predetermined area of the screen and repeat the step of judging whether the image of the current predetermined area is the same as the image of the predetermined area obtained when the previous predetermined time length was reached; and if the images are not the same, sending, by the first mobile terminal, the image of the current predetermined area to the second mobile terminal, and using, by the second mobile terminal, the received image of the current predetermined area to replace the image of the predetermined area received when the previous predetermined time length was reached to display the image of the current predetermined area on the desktop of the second mobile terminal.

2. The desktop sharing method according to claim 1, wherein, the step of, when the predetermined time length is reached, judging, by the first mobile terminal, whether the image of the current predetermined area is the same as the image of the predetermined area obtained when the previous predetermined time length was reached comprises:
   when the predetermined time length is reached, intercepting, by the first mobile terminal, the current image corresponding to the predetermined area; and
   determining, by the first mobile terminal, whether the current image of the predetermined area is the same as the image of the predetermined area obtained when the previous predetermined time length was reached according to an area change detection algorithm.

3. The desktop sharing method according to claim 2, wherein, the predetermined area at least comprises one of the following areas:
  dividing the entire screen into a plurality of subareas, and using each subarea as one predetermined area, wherein, each subarea comprises one or more icons;
  splitting the entire screen, and using each split-screen area as one predetermined area; and
  using an icon of each widget on the screen as one predetermined area.

4. The desktop sharing method according to claim 1, wherein, the predetermined area at least comprises one of the following areas:
  dividing the entire screen into a plurality of subareas, and using each subarea as one predetermined area, wherein, each subarea comprises one or more icons;
  splitting the entire screen, and using each split-screen area as one predetermined area; and
  using an icon of each widget on the screen as one predetermined area.

5. A desktop sharing method, comprising:
  establishing, by a second mobile terminal, a connection with a first mobile terminal; and
  after the connection succeeds, receiving, by the second mobile terminal, a predetermined area image of a screen of the first mobile terminal sent by the first mobile terminal, and displaying the predetermined area image on a desktop of the second mobile terminal,
  wherein, the step of displaying the predetermined area image on the desktop of the second mobile terminal comprises:
  performing analysis on the received predetermined area image to determine a division situation of a predetermined area of the screen of the first mobile terminal; and displaying the predetermined area image on the desktop of the second mobile terminal according to the division situation,
  wherein, the step of performing analysis on the image to determine a division situation of a predetermined area of the screen of the first mobile terminal comprises:
  receiving the image of the predetermined area sent by the first mobile terminal, wherein, the image of the predetermined area is an image of a current predetermined area of the first mobile terminal, and is sent by the first mobile terminal when the predetermined time length is reached and the image of the current predetermined area is judged to be not the same as the image of the predetermined area obtained when a previous predetermined time length was reached;
  judging, by the second mobile terminal, to which predetermined area of the first mobile terminal the image of the predetermined area belongs after receiving the image of the predetermined area; and
  splicing, by the second mobile terminal, the image of the predetermined area to a corresponding predetermined area of a screen of the second mobile terminal after the predetermined area to which the image of the predetermined area belongs is determined.

6. A first mobile terminal, comprising a first connection module and a first sending module, wherein:
  the first connection module is arranged to make the first mobile terminal establish a connection with a second mobile terminal; and
  the first sending module is arranged to, after the connection succeeds, send a predetermined area image of a screen of the first mobile terminal to the second mobile terminal to display the predetermined area image on a desktop of the second mobile terminal,
  wherein the second mobile terminal judges to which predetermined area of the first mobile terminal the image of the predetermined area belongs after receiving the image of the predetermined area; and
  the second mobile terminal splices the image of the predetermined area to a corresponding predetermined area of a screen of the second mobile terminal after the predetermined area to which the image of the predetermined area belongs is determined,
  the first mobile terminal further comprises a detection module, wherein:
  the detection module is arranged to detect a predetermined area of the screen of the first mobile terminal according to a predetermined time length; and judge whether an image of a current predetermined area is the same as an image of the predetermined area obtained when a previous predetermined time length was reached; and
  the first sending module is further arranged to, when the predetermined time length is reached and the detection module judges that the image of the current predetermined area is not the same as the image of the predetermined area obtained when the previous predetermined time length was reached, notify the second mobile terminal to use the received image of the current predetermined area to replace the image of the predetermined area received when the previous predetermined time length was reached to display the image of the current predetermined area on the desktop of the second mobile terminal.

7. The first mobile terminal according to claim 6, wherein, the detection module comprises an image interception unit and a detection unit, wherein:
  the image interception unit is arranged to, when the predetermined time length is reached, intercept a current image corresponding to the predetermined area; and
  the detection unit is arranged to determine whether the image of the current predetermined area is the same as the image of the predetermined area obtained when the previous predetermined time length was reached according to an area change detection algorithm.

8. The first mobile terminal according to claim 6, further comprising an area division module, wherein:
  the area division module is arranged to perform a division of the predetermined area on the screen of the first mobile terminal, wherein, the predetermined area at least comprises one of the following areas:
  dividing the entire screen into a plurality of subareas, and using each subarea as one predetermined area, wherein, each subarea comprises one or more icons;
  splitting the entire screen, and using each split-screen area as one predetermined area; and
  using an icon of each widget on the screen as one predetermined area.

9. A second mobile terminal, comprising a second connection module, a second receiving module and an analysis module, wherein:
  the second connection module is arranged to make the second mobile terminal establish a connection with a first mobile terminal;
  the second receiving module is arranged to, after the connection succeeds, receive a predetermined area image of a screen of the first mobile terminal sent by the first mobile terminal; and the analysis module is arranged to perform analysis on the image of the screen of the first mobile terminal to determine a division situation of a predetermined area of the screen of the first mobile terminal; and display the predetermined area image on a desktop of the second mobile terminal according to the division situation, the second mobile terminal further comprises a processing module, wherein:

the image of the predetermined area is an image of a current predetermined area of the first mobile terminal, and is sent by the first mobile terminal when the predetermined time length is reached and the first mobile terminal judges that the image of the current predetermined area of the first mobile terminal is not the same as the image of the predetermined area obtained when a previous predetermined time length was reached;

the analysis module is further arranged to judge to which predetermined area of the first mobile terminal the image of the predetermined area belongs after the image of the predetermined area is received; and the processing module is arranged to splice the image of the predetermined area to a corresponding predetermined area of a screen of the second mobile terminal after the predetermined area to which the image of the predetermined area belongs is determined.

10. A non-transitory computer-readable medium carrying a computer program, the computer program comprises program instructions, wherein, when the program instructions are executed by a first mobile terminal, the first mobile terminal can implement the desktop sharing method according to claim 1.

11. A non-transitory computer-readable medium carrying the computer program, the computer program comprises program instructions, wherein, when the program instructions are executed by a second mobile terminal, the second mobile terminal can implement the desktop sharing method according to claim 5.

* * * * *